C. W. SALADEE.
Improvement in Top Joints and their Connections.
No. 123,936. Patented Feb. 20, 1872.
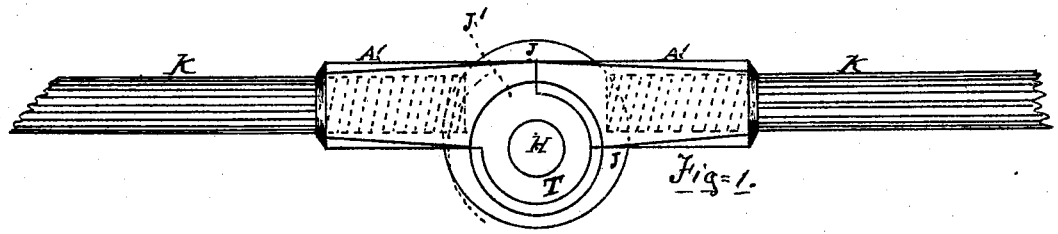
Fig=1.
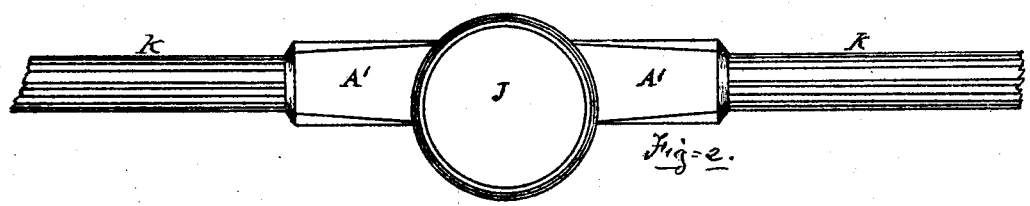
Fig=2.
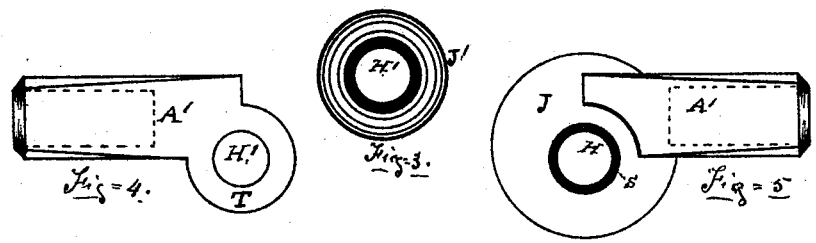
Fig=4. Fig=3. Fig=5.
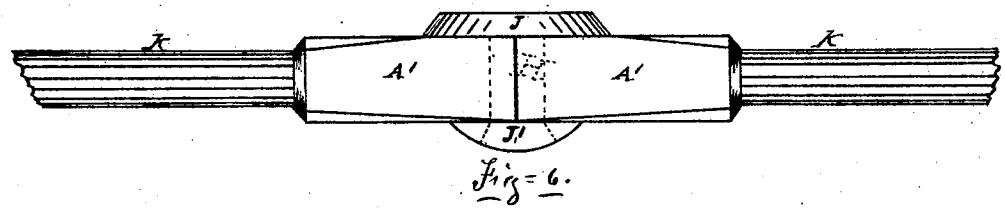
Fig=6.

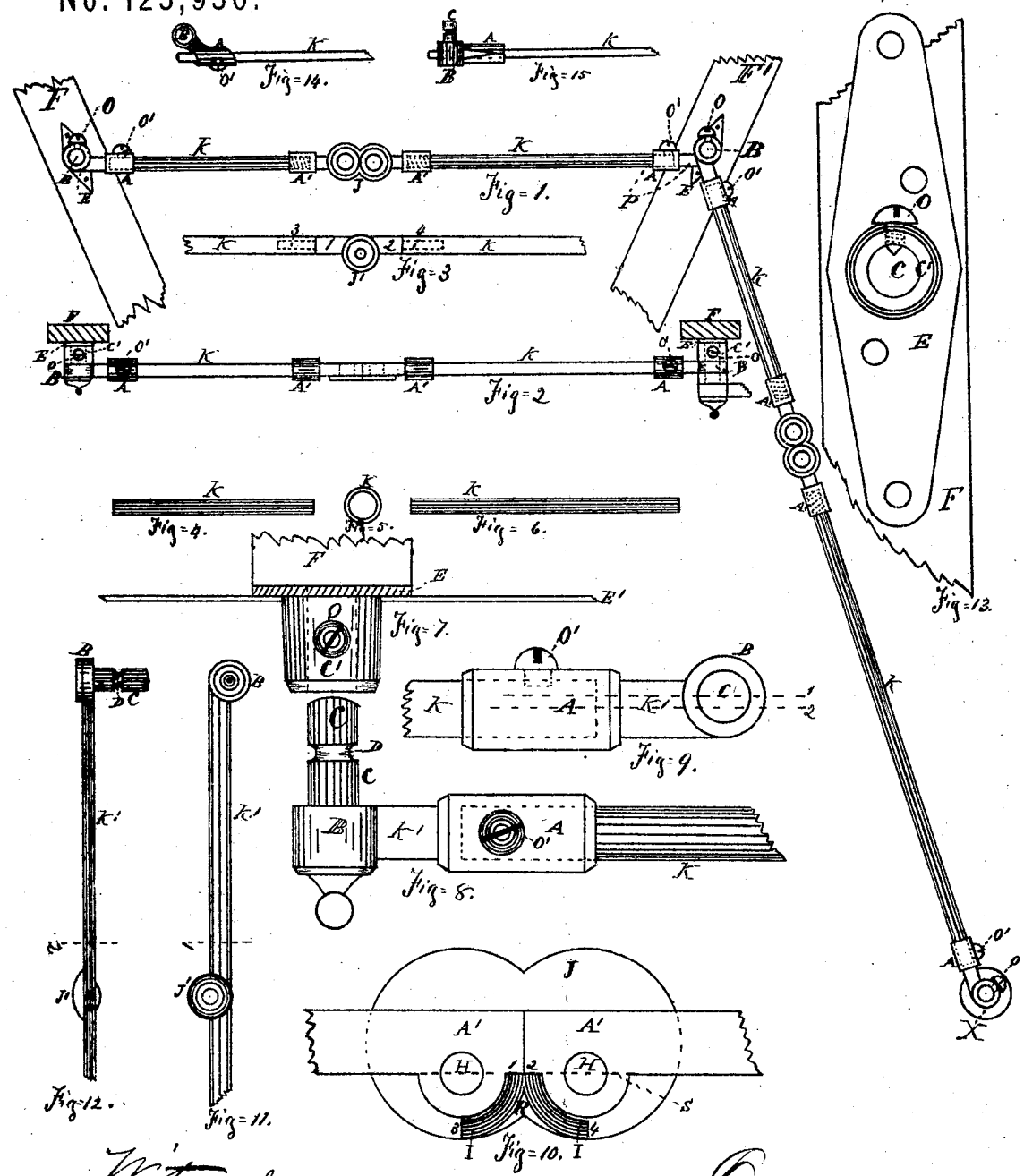

123,936

UNITED STATES PATENT OFFICE.

CYRUS W. SALADEE, OF ST. CATHARINE'S, CANADA.

IMPROVEMENT IN TOP-JOINTS AND THEIR CONNECTIONS.

Specification forming part of Letters Patent No. 123,936, dated February 20, 1872.

SPECIFICATION.

Be it known that I, CYRUS W. SALADEE, of St. Catharine's, in the Dominion of Canada, have invented certain Improvements in Top-Joints and their Connections, of which the following is a specification embodying my invention:

The subject of my present invention relates to sundry improvements upon the top-joints and their connections for which Letters Patent of the United States were granted to me on the 19th day of December, 1871, and which improvements upon said patent, as hereinafter shown and described, furnish an essential addition to my original invention, as secured by the above-recited patent. The first part of my present invention has for its object the construction of the main body of top-joint irons from light steel or iron tubing, and with the view of making these parts lighter and stronger than can be done under the present mode of making them of solid metal. The second part of my invention has for its object a method of securing the ends of the said tubular irons to the top props by means of an open socket, as hereinafter shown and described. The third part of my invention has for its object a new and improved mode of constructing a thimble-prop in connection with a suitable stud or pivot formed solid upon the outer extremities of the top-irons or upon the head of the socket made to receive the outer ends of the top-irons, as hereinafter more fully shown and described. The fourth part of my invention relates to a peculiar formation of an open socket, in connection with the thimble-prop above named, for the reception of the outer ends of the joint-irons. The fifth part of my invention relates to an improved mode of constructing the "double knuckle-joint," described in my patent of December 19, 1871, as well as an improved mode of constructing single knuckle-joints, to be made of malleable cast-iron.

In the drawing, Figure 1, Sheet 1, represents a complete set of my improved top-joints as in position on the left side of a carriage-top.

F and F' are portions of the bows of the top to which the thimble-plates E are secured, as shown. A represents the sockets, secured and operated upon the thimble-plate E, and which receives the outer ends of the hollow tubing K, and which latter is firmly held in the socket by set-screws O, resting in a corresponding countersink made in the end of the tubing at that point. In this, Fig. 1, is shown the double knuckle-joint J, which is fully described in my patent of December 19, 1871. These joints have socket-arms A', into which are screwed, or otherwise rigidly secured, the inner ends of the tubular braces K; and the application and use of said tubular braces K is not limited to the double knuckle-joint, as shown by Figs. 1 and 2, but may be as readily used in combination with the ordinary single "stub-joint," as will be seen by reference to Fig. 3, Sheet 1. Here the arms 1 and 2 of the joint J' are reduced at each end so as to form a pin equal in diameter to that of the hole in the end of the tube K, and the connection is made by a screw-thread cut on each; or the pins 3 and 4 may be slipped into the ends of the tubes and welded thereto; or these parts may be held together by means of set-screws.

Of course, solid steel or iron braces may be substituted for the tubing K by exactly the same arrangement of parts shown in Figs. 1, 2, 7, 8, 9, and 13, in all cases where that is desirable.

The primary object of my invention is to manufacture top-irons in complete sets; requiring of the carriage-builders no further preparation than to cut off the outer ends of the braces K to the required length, which are then passed into the sockets upon the top and seat props, and there rigidly secured by the set-screws O', as seen in the drawing, or in any other manner that will firmly hold these parts together.

These sockets A I make and connect to the thimble-plate E as follows, viz.: A face view of the thimble-plate E is shown by Fig. 13 in position upon the bow F, an edge view of which is seen in Fig. 7. Upon the center of this thimble-plate E is formed or cast solid with the plate the thimble C', through which is pierced the hole C. On the top side of this thimble is the set-screw O, (see Figs. 7 and 13,) which passes through the shell of the thimble into the hole C, as seen in Fig. 13. The socket A is now formed substantially as shown by Figs. 8 and 9, the outer end of which has a rounded head, B, formed upon it, the center of which, from a side view, is above the center of the socket A, as shown by the dotted lines 1 and 2, Fig. 9. The inside of the head B has formed upon it (solid and as a part of it) the stud C, Fig. 8, and in the center between the ends of this stud C is made the indented groove D, extending the whole way round the stud, and is of a depth and proportion corresponding with the point of the set-screw O, seen in Fig. 13. This stud C is now passed into the hole through the thimble C', when the set-screw O is screwed down until the point firmly rests in the groove D of the stud C, when the connection is permanently effected without the use of the ordinary "cap-nut," now in general use upon "top-props," and the stud C is permitted to revolve freely in the thimble, while the point of the set-screw, resting in the groove D of the stud C, effectually prevents the latter from working out of the thimble.

The thimble C' and thimble-plate E. head B, and stud C, hereinbefore described, are not limited in their use in connection with the socket A, as shown in Figs. 2, 7, and 8; but I contemplate using these parts in connection with the ordinary joint-irons, as shown by Figs. 11 and 12. In the latter case I shall furnish to the trade the joint-irons in sets the required lengths, and afterward to be welded to the common stub-joints, as indicated by the dotted lines 1 and 2, Figs. 11 and 12. The main body K' of these irons will be made of oval iron, with the head B and stud C formed solid upon the outer ends, as shown by Figs. 11 and 12, and with the thimble-plates, Figs. 7 and 13, and the outer cap of the seat-prop X, Fig. 1, fitted thereto. On the rear or middle bow F', Fig. 1, I use the same thimble-plate E as on the front bow, and the socket A, on the rear end P of the short joint-brace K, has a hole, C, through the head B. (See Fig. 9.) This hole is passed over the stud C, Fig. 8, which latter is made of suitable length to pass through it and into the thimble C', and there to be held by the set-screw O, seen in Fig. 13.

Figs. 4 and 6, Sheet 1, are detached views of the tubular braces K, and Fig. 5 is an end view of the same.

Another modification of the socket A, in combination with the head B, stud C, and the thimble-plate E, is shown by Figs. 14 and 15, Sheet 1. In this modification the socket A is formed on a line below the center of the head B, and is open at both ends, and allows the joint-iron K to pass through and to be held at the desired point by means of the set-screw O, resting in a countersink made in the iron K at this point.

Fig. 10, Sheet 1, represents, substantially, the double knuckle-joint shown in my patent of December 19, 1871, but with two additional improvements, viz., the pivots H and H pass through the arms A' and A' on a line center with the lower edge of the arms and on the dotted line S. The intermediate brace R is so formed as to furnish a square stop for the inner ends 1 and 2 of the arms A', and so, also, as to furnish a square stop at 3 and 4 for the lower edge of the arms A' when they are turned around at right angles to their present position. The pivots H and intermediate brace R are cast solid with the face-plate J, and the arms A' are held in position by riveting a head or "burr" on the ends of the pivots.

On Sheet 2 of the drawing is clearly shown my improved "single knuckle-joint," the peculiar formation of which admits of making a really good and serviceable top-joint of malleable cast-iron, and hence materially cheaper than those made of wrought-iron.

Fig. 1, Sheet 2, is an inside view of the joint, with pieces of the arms or braces K in position, which latter may be of tubular or solid steel or iron. Fig. 2 is a face view of Fig. 1. Fig. 3 is the washer J, which receives the pivot H, as seen in Fig. 1. Figs. 4 and 5 are detached views of the joint. In Fig. 5 the face-plate J has the pivot H and the socket-arm A' formed or cast solid upon its inside surface, while Fig. 4 represents the form of the other socket-arm A', which matches upon the face-plate J and pivot H of Fig. 5, and when in position the washer J' is passed over the pivot, and the whole is held in position by riveting a "burr" or head on the end of the pivot to fill the countersink made in the outside edge of the hole in the washer J', as shown by the dotted lines in the top view of the complete joint, Fig. 6.

*Claims.*

I claim—

1. Joint-irons for carriage-tops having their main body formed of steel or other suitable metallic tubing.

2. The socket A, closed at the outer end, and terminating in the head B, having the center of the latter above a line center to the socket A, as shown and described.

3. In combination with the head B, the stud C, as described.

4. The thimble-plate E, having formed upon it the thimble C', with the set-screw O, or the equivalent.

5. The combination of the head B, (whether formed on the end of the socket A, as claimed in the second claim, or on the ends of the joint-irons K', Figs. 11 and 12,) stud C, with the groove D, thimble-plate E, and thimble C'.

6. Securing and operating the stud C of the head B in the thimble C' by means of the groove D and set-screw O, or their equivalents.

7. The head B, having a hole through its center, through which to pass the stud C, in combination with the thimble-plate E and thimble C', as and for the purpose specified.

8. The combination of the open socket A, Figs. 14 and 15, with the head B, stud C, and set-screw O, substantially as and for the purpose set forth.

9. In "double knuckle-joints," forming the center of the pivot-holes H, Fig. 10, in the arms A on a line with the lower edge of the arms, and extending the inner ends of the arms to form the bearings 1 and 2.

10. In double knuckle-joints, the intermediate brace R, as and for the purpose specified.

11. A top-joint substantially as shown by the drawings on Sheet 2, as and for the purpose specified.

CYRUS W. SALADEE.

Witnesses:
E. DAVIS,
EDM. F. BROWN.